(12) United States Patent
Koch

(10) Patent No.: US 6,439,550 B1
(45) Date of Patent: Aug. 27, 2002

(54) ADHESIVE LAMINATE AND METHOD OF SECURING A RUBBER AIR SPRING TO A FIXTURING SLEEVE

(75) Inventor: Russell W. Koch, Hartville, OH (US)

(73) Assignee: BFS Diversified Products, LLC, Carmel, IL (US)

(*) Notice: Subject to any disclaimer, the term of this patent is extended or adjusted under 35 U.S.C. 154(b) by 767 days.

(21) Appl. No.: 08/801,676

(22) Filed: Feb. 18, 1997

(51) Int. Cl.⁷ .................................................. F16F 9/04
(52) U.S. Cl. ..................... 267/64.23; 156/314; 156/315
(58) Field of Search ................ 156/314, 315; 267/64.23

(56) References Cited

U.S. PATENT DOCUMENTS

| | | | | |
|---|---|---|---|---|
| 2,226,605 A | * | 12/1940 | Geyer et al. | 267/64.23 |
| 2,711,383 A | * | 6/1955 | Ruggeri et al. | 156/314 |
| 4,029,305 A | * | 6/1977 | Schubert et al. | 267/64.23 |
| 4,327,150 A | * | 4/1982 | White et al. | 156/315 |
| 4,755,548 A | * | 7/1988 | Iwasa et al. | 156/315 |

FOREIGN PATENT DOCUMENTS

FR 2303843 * 10/1976 .................. 156/315

* cited by examiner

*Primary Examiner*—John J. Gallagher
(74) *Attorney, Agent, or Firm*—Daniel Hudak; Meredith Palmer

(57) ABSTRACT

A vehicle (e.g., a truck) rubber air spring is bonded to a seat of a fixturing sleeve. A bead of the air spring has a rubber primer thereon and the seat of the fixturing sleeve has a fixturing primer thereon. An adhesive located between the rubber and fixturing primers permanently secures the air spring to the sleeve seat.

11 Claims, 3 Drawing Sheets

ADHESIVE LAMINATE AND METHOD OF SECURING A RUBBER AIR SPRING TO A FIXTURING SLEEVE

FIELD OF THE INVENTION

The present invention relates to a method as well as an adhesive laminate for permanently bonding a rubber air spring to a support sleeve.

BACKGROUND OF THE INVENTION

Heretofore, air springs have been utilized to cushion the movement between a vehicle axle or wheel and the frame of a vehicle. Typically, the spring has been physically attached to a housing such as a metal sleeve on an axle either by force fit, or by a metal crimping ring, or both. A disadvantage of the force fit was that during handling prior to installation on a vehicle, the air spring would often separate from the metal sleeve and thus had to be reassembled. A disadvantage of the metal crimping ring was that it required additional labor to install and was costly.

SUMMARY OF THE INVENTION

A rubber air spring having a bead portion is adhered to a seat portion of a fixturing sleeve. The rubber air spring bead portion has a rubber primer such as trichlorotriazinetrione applied thereto and the sleeve seat has a fixturing primer such as a mixture of chlorosulfonated polyethylene, chlorinated paraffin, and poly(p-dinitrosobenzene) applied thereto. The rubber primer and fixturing primer are chemically bonded or adhered together through the utilization of an adhesive such as an epoxy. A strong bond is formed which is at least twice the force required to hold the air spring in place.

DETAILED DESCRIPTION OF THE PREFERRED EMBODIMENT

Figure 1:
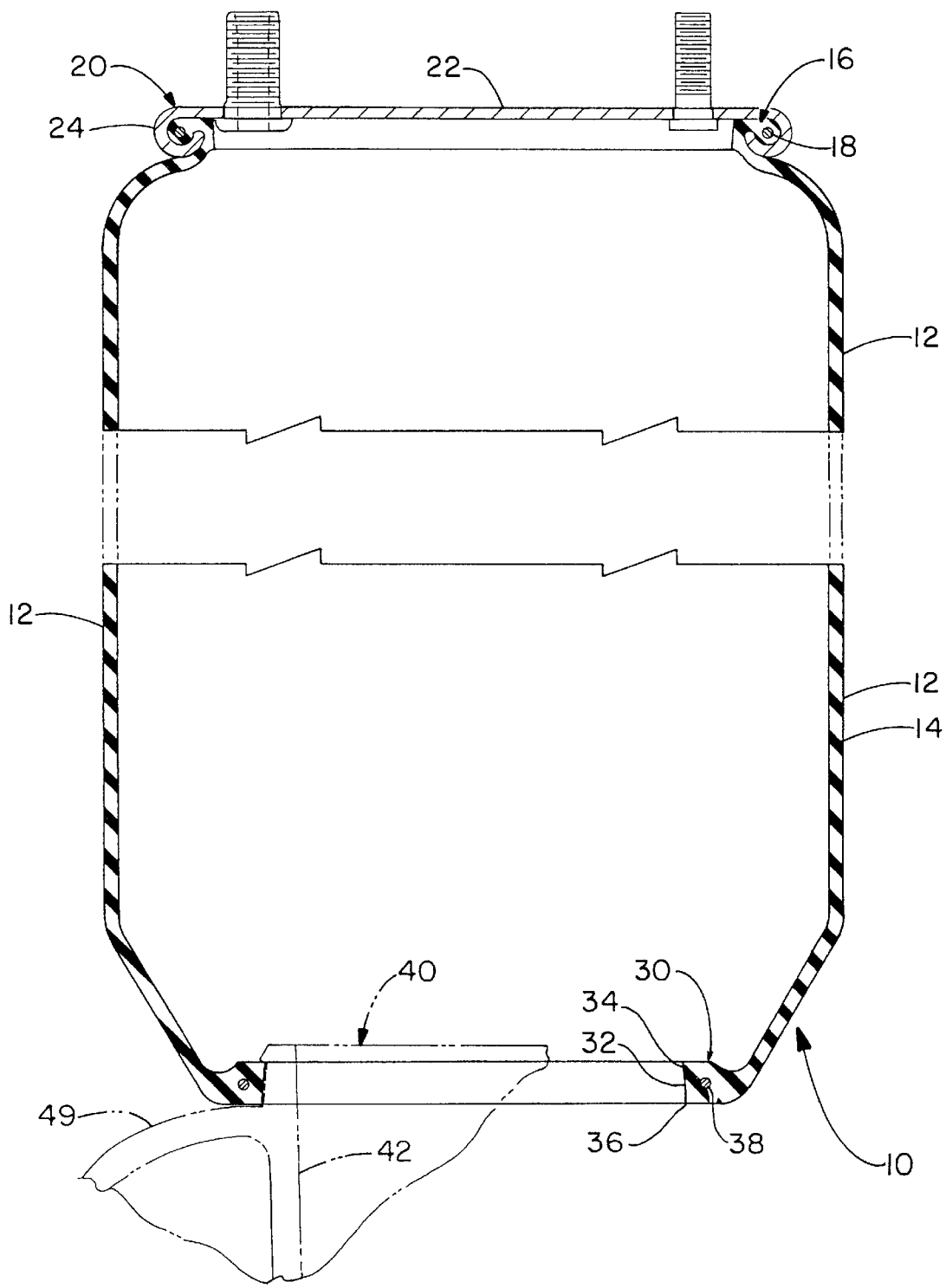
FIG. 1 is a cross sectional view of a vehicle air spring in an extended configuration having a lower end adhesively attached to a fixturing sleeve.
Figure 3:
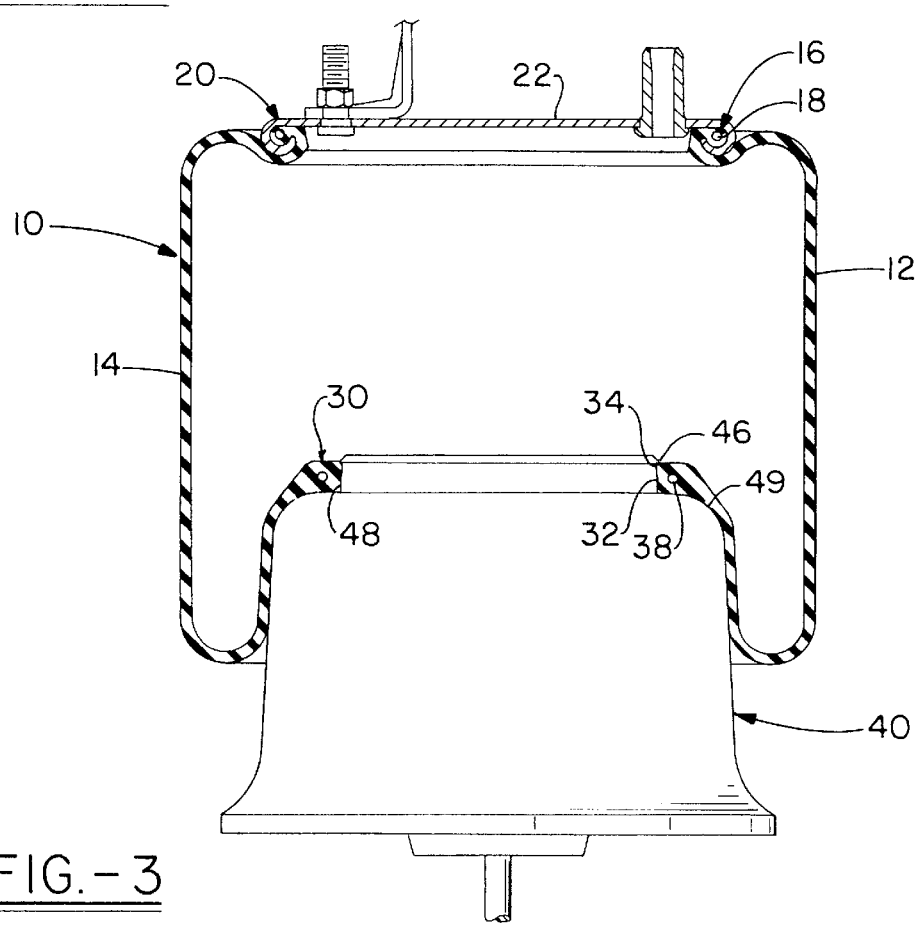
FIG. 3 is a cross sectional view showing the air spring in a compacted use position.

The air spring of the present invention, generally indicated by the numeral 10, can be any conventional air spring known to the art and to the literature. Air spring 10 is made out of one or more rubbers and has at least one to about 6 plies therein with two or three plies being preferred. The plies 12 permit only slight radial expansion of the air spring when placed under a load, i.e., mounted on a vehicle, as shown in FIG. 3. By the term "slight radial expansion" it is meant that the outward radial expansion of the air spring under load versus no load is generally 10 percent or less, desirably 5 percent or less, and preferably 2 percent or less or no expansion at all. The plies 12 can be of any conventional or suitable material such as rayon, polyester, nylon, and Kevlar, with nylon generally being preferred. The air spring can be made out of any conventional rubber 14 and generally is a rubber made from a conjugated diene having 4 to 10 carbon atoms such as butadiene, isoprene, 2-chlorobutadiene, and the like, optionally copolymerized with a vinyl substituted aromatic having from 8 to 12 carbon atoms such as styrene, α-methylstyrene, and the like. Preferred rubbers include natural rubber, a blend of natural rubber and styrene-butadiene rubber, styrene-butadiene rubber, synthetic polyisoprene rubber, and preferably a blend of natural rubber and neoprene. The rubber air spring (when extended) is generally in the shape of a cylinder as shown in FIG. 1 and contains a top end or bead portion 16 and a bottom end or bead portion 30. The top bead portion contains a metal bead 18 therein. As best seen in FIG. 1, the top bead portion is crimped to a bracket 20 which is affixed to the frame (not shown) of a vehicle such as a truck. The frame contains a metal bottom plate 22 which is bendable at the perimeter thereof. In order to form a mechanical bond, perimeter 24 of the bottom plate is bent and crimped about top bead 16 portion in a manner as shown in FIGS. 1 and 3 in order to securely engage the top portion of the air spring to bracket 20.

Figure 2:
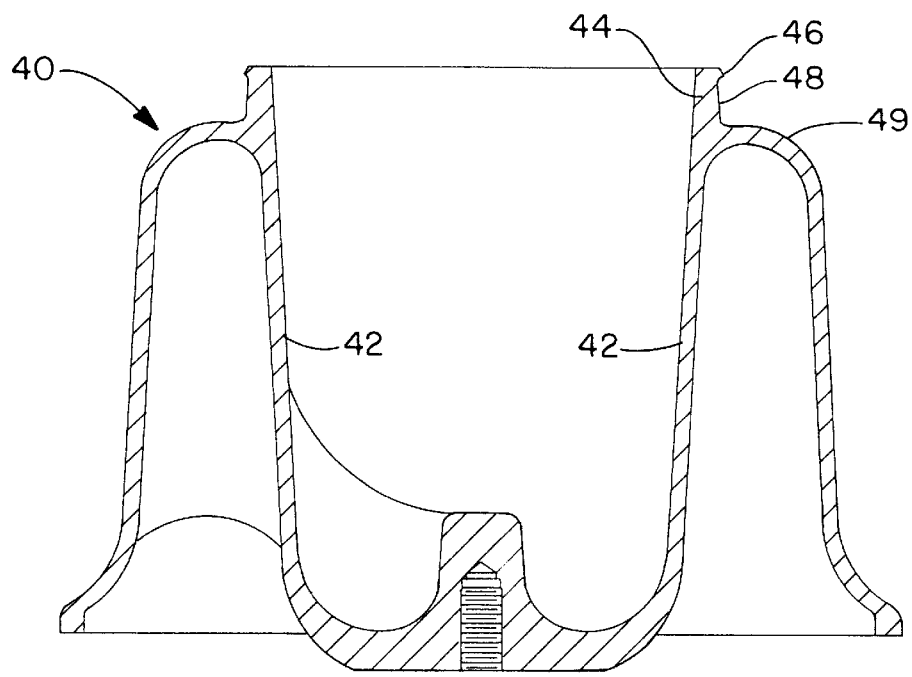
FIG. 2 is a cross sectional view of the fixturing sleeve of FIG. 1.

Bottom bead portion 30 of the air spring as seen in FIG. 1 generally contains a squared off or flat surface 32 and has a bead toe 34, a bead heel 36, and a metal reinforcing bead 38. The bottom bead portion 30 of air spring 10 is attached to a fixturing sleeve 40 which is generally fastened to an axle of a vehicle. As best shown in FIG. 2, the fixturing sleeve has reinforcing webs 42 and upward extending circumferential arm 44. Arm 44 has a small outwardly radially extending flange 46 and a radially outward facing seat 48 thereon. The upper portion of arm seat 48 is terminated by flange 46 and the bottom portion of the seat is terminated by fixturing sleeve shoulder 49. The length of arm seat 48 is approximately equal to the distance of the bottom bead 30 from bead toe 34 to bead heel 36. The fixturing sleeve preferably is made from metal such as iron, steel (including stainless steel), aluminum, bronze, and the like, with aluminum being preferred. The sleeve can also be made from composite materials such as sheet molded compounds, graphite fiber-polyphenylene sulfide, and the like.

During the installation of air spring 10 to fixturing sleeve 40, bottom bead portion 30 is slipped over sleeve flange 46 so that bottom flat surface 32 of air spring bead 30 is flush and resides against sleeve arm seat 48.

Figure 4:
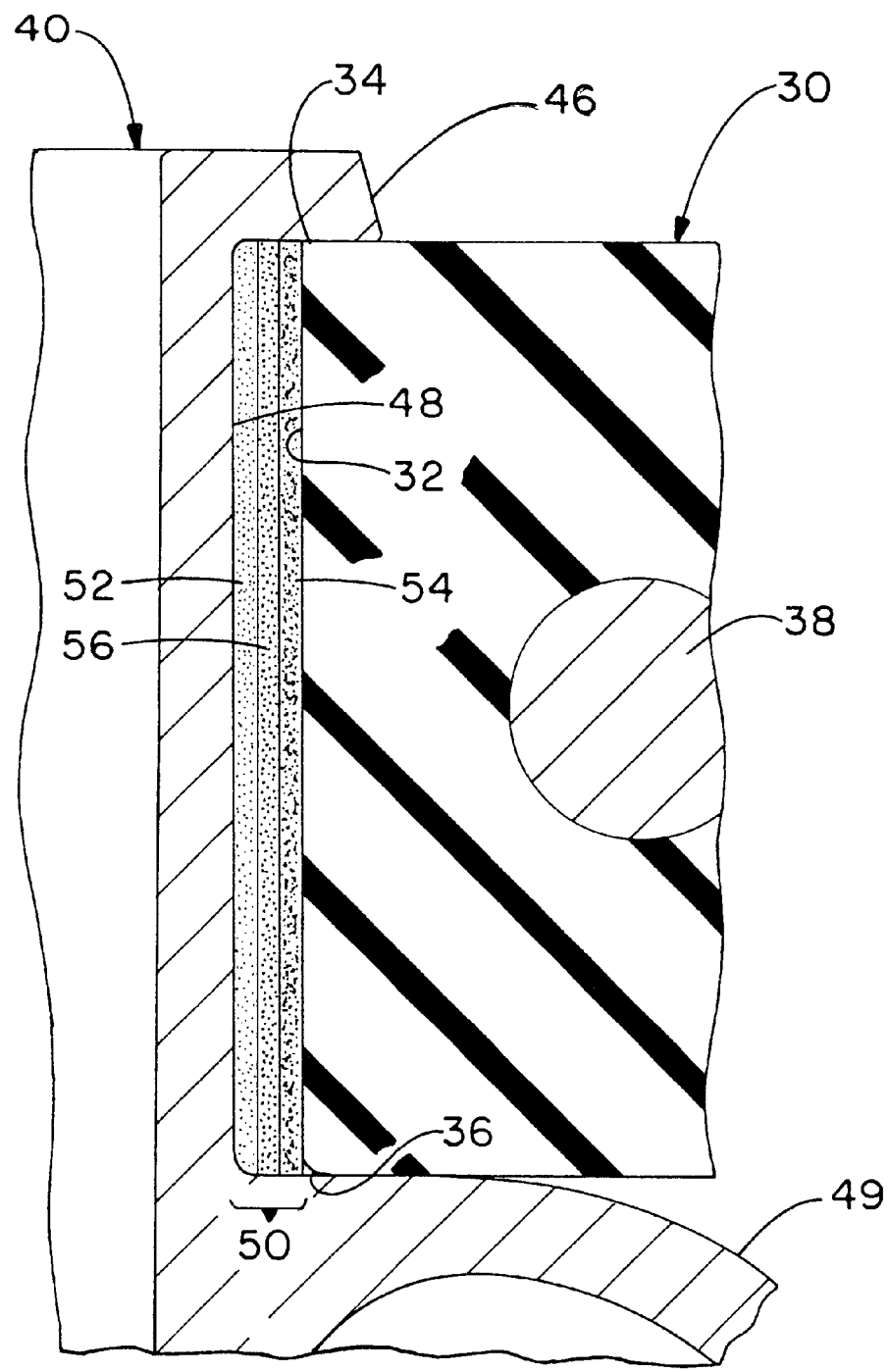
FIG. 4 is a cross sectional view showing the adhesive laminate of the present invention adhering an air spring bead portion to the fixturing sleeve.

According to the concepts of the present invention, bottom bead portion 30 is chemically bonded through an adhesive laminate 50 to arm seat 48 of the fixturing sleeve. As seen in FIG. 4, laminate 50 generally comprises 3 layers, for example, a fixturing primer which preferably is metal primer layer 52, a rubber primer layer 54, and an adhesive layer 56. Each of the various layers can be made from one or more coatings, applications, or the like.

Generally, any conventional rubber primer known to the art and to the literature can be utilized. Heretofore, typically chlorine or chlorine-containing compounds have been utilized to prime rubber. That is, a halogen or preferably a chlorine donor compound is utilized. A preferred rubber primer of the present invention is trichlorotriazinetrione which can be applied to the rubber as by brushing, spraying, etc., desirably in a multiplicity of coats. For example, a 3 percent trichlorotriazinetione solution in butyl acetate can be applied in a plurality of coatings such as three, allowing several minutes, e.g., 5 minutes drying time between coatings. Immediately after application of the last coating, its surface can be wiped off with Rymplecloth to remove by-products such as oils which migrate to the surface. The air spring can then be allowed to dry at ambient temperature for about 10 to 15 minutes.

Other rubber primers include the various N-halohydantoins, the various N-haloamides, the various N-haloimides, and combinations thereof. Examples of various desirable N-halohydantoins include 1,3-dichloro-5,5-dimethyl hydantoin; 1,3-dibromo-5,5-dimethyl hydantoin; 1,3-dichloro-5-methyl-5-isobutyl hydantoin; and 1,3-dichloro-5-methyl-5-hexyl hydantoin. Examples of N-haloamides include N-bromoacetamide and tetrachloroglycoluril. Examples of N-haloimides include N-bromosuccinimide and the various chloro substituted s-triazinetriones, commonly known as mono-, di-, and trichloroisocyanuric acid. The various mono-, di-, or trichloroisocyanuric acids, or combinations thereof are a preferred rubber primer with trichloroisocyanuric acid being especially preferred. A three percent by weight trichloroisocyanuric acid solution in butyl acetate is available from Lord Corporation as Chemlok 7707.

The various N-halohydantoins, N-haloamides, and N-haloimide rubber primers usually exist in solid form. They are readily soluble in polar solvent such as acetone and can be applied in liquid form. Application of these rubber primers generally occur at ambient temperatures. Application can be in any conventional manner as through brushing, spraying, and the like. A typical amount of the N-halohydantoins, N-haloamides, and N-haloimide primer in the solvent, for example, ethyl acetate or acetone, is generally from about 0.1 to about 10 percent by weight based upon the total weight of said rubber primer and solvent, and preferably is from about 0.5 percent to about 5 percent. Of course, higher or lower concentrations can be utilized. This solvent system has been found to dry within a matter of minutes so that the adhesive (e.g., rubber to metal) can be applied shortly thereafter. It is thought that the rubber primer adds halogen groups, for example, chlorine to the cured rubber bead which activates the surface thereof, allowing the adhesive to adhere strongly to the cured rubber surface.

Still additional rubber primers include various acetamides such as chloroacetamide, bromoacetamide, iodoacetamide, and the like.

The thickness of the rubber primer layer 54 can vary greatly and often is thin since it reacts with the rubber.

The fixturing primer of the present invention preferably is any conventional metal primer although it can be a composite primer. A preferred metal primer is Chemlok 254 (Lord Corporation) which is a mixture of a polymer, a halogenated paraffin, and a curative, dissolved or dispersed in an organic solvent system such as toluene and xylene. This composition is generally a black liquid has a viscosity range (Brookfield LVT, Spindle No. 2 at 30 rpm at 77° F. (25° C.)) of 150 to 450 centipoises contains approximately 25–30 percent by weight of non-volatile contents has a density of approximately 8.1 to 8.5 lbs./gal. a flash point of 44° F. (7° C.), and a shelf life of generally 6 months at 70–80° F. (21–26° C.) storage temperature. More specifically, Chemlok 254 is believed to be a mixture of chlorosulfonated polyethylene (for example, Hypalon 48) chlorinated paraffin (for example, Chlorowax 40), poly(p-dinitrosobenzene) and carbon black dissolved or dispersed in a mixture of toluene and xylene. The chlorosulfonated polyethylene is characterized by infrared (IR) spectroscopy as having absorption bands at 1420, 1428, 1362, 1250, 1162, 658, and 604 $cm^{-1}$. The chlorinated polyethylene is characterized by having IR absorption bands at 1458, 1445, 1371, 1258, 907, 789, 732, 651, and 613 $cm^{-1}$. Poly(p-dinitrosobenzene) was identified by IR absorption bands at 3111, 1483, 1458, 1258, 1102, 1008, 857, 776, and 563 $cm^{-1}$. Chemlok 254 also contained a small amount of yellow material which was characterized by IR absorption bands at 3104, 1715, 1602, 1600, 1496, 1371, 1152, 826, and 701 $cm^{-1}$.

An example of another metal primer is an aqueous metal primer composition containing a polyvinyl alcohol-stabilized aqueous phenolic resin dispersion, a latex of a halogenated polyolefin, and metal oxide. Such a compound is described in U.S. Pat. No. 5,200,455, which is hereby fully incorporated by reference with regard to all aspects thereof including the making and preferred embodiments of the aqueous metal primer composition. The polyvinyl alcohol-stabilized aqueous phenolic resin dispersion can be prepared by mixing a) a pre-formed, solid-substantially water-insoluble, phenolic resin; b) water; c) an organic coupling solvent; and d) polyvinyl alcohol, at a temperature and a period of time sufficient to form a dispersion of said phenolic resin in the water. More specifically, the polyvinyl alcohol is first dissolved in a mixture of the water and the coupling solvent, and the solid phenolic resin then added slowly while increasing the agitation and temperature of the mixture. After agitating at high speed to temperatures of 55 to 75° C., a dispersion forms without scrap or wasted material. Subsequent batches of the dispersion can be prepared immediately without having to clean the equipment.

The phenolic resins that are employed in the invention are well known compositions. They are solid resoles or novolaks. The resoles employed are normally base catalyzed resins having a formaldehyde factor (i.e., parts, by weight, of 40 weight percent aqueous formaldehyde per 100 parts by weight of unsubstituted phenol) of the order of about 90 to about 180. The novolaks employed are normally acid catalyzed resins having a formaldehyde factor of the order of from about 50 to about 75.

The phenol employed for producing the phenolic resins of the invention can be unsubstituted phenol, or it can be substituted phenol such as cresol, bisphenol-A, para-substituted phenols such as para-t-butylphenol, para-phenylphenol, and the like. Ordinarily, formaldehyde or a material that generates formaldehyde in situ is the aldehyde that is employed to make the phenolic resin.

The phenolic resin also utilizes a coupling solvent, that is, a solvent that is miscible with water and which is a solvent for the phenolic resin employed. The miscibility with water should be complete, and the phenolic resin should be soluble in the coupling solvent such that solutions of up to about 80 weight percent phenolic resin (based on solution weight) can be made. The boiling point of the coupling solvent is preferably within the range of from about 75° C. to about 230° C. Most volatile solvents, such as methanol and acetone, cause blistering in coatings made from the dispersions, and often have dangerously low flash points.

Alcohols, glycol ethers, ethers, esters, and ketones have been found to be the most useful coupling solvents. Specific examples of useful coupling solvents include ethanol, n-propanol, isopropyl alcohol, ethylene glycol monobutyl ether, ethylene glycol monoisobutyl ether, ethylene glycol monomethyl ether acetate, diethylene glycol monobutyl ether, diethylene glycol monoethyl ether acetate, propylene glycol monopropyl ether, methoxy acetone, and the like.

The polyvinyl alcohol employed in the phenolic resin is typically prepared by hydrolysis of polyvinyl acetate, and the most useful polyvinyl alcohol polymers for use in the invention are hydrolyzed to an extent of from about 85 to about 91 percent, and have a molecular weight such that a 4 percent solids solution of the polyvinyl alcohol in water has a viscosity of from about 4 to about 25 centipoises at 25° C.

The one or more fixturing primers such as a metal primer utilized in the present invention are generally dissolved in an aliphatic solvent such as a ketone, for example, acetone, an ester solvent such as butyl acetate, or ethyl acetate, or in an aromatic solvent such as toluene or xylene, or mixtures thereof. Once the primer is applied to the metal substrate, it can be dried at room temperature generally from about 10 to about 30 minutes and then heat cured at elevated temperatures. The elevated temperatures can vary from about 40° C. to the decomposition temperature of the primer and preferably from about 60° C. to about 100° C. for a time of approximately 15 minutes to 20 hours. The metal substrate, e.g., the aluminum fixturing sleeve, is then allowed to cool to room temperature.

Before the above fixturing primer is applied to the fixturing sleeve, the same is cleaned to remove any oxidation layers and oils. Surface treatment preparations include sanding, sand blasting and degreasing with suitable solvent such as acetone, hexane, or mineral spirits. One or more layers of the primer can be applied in any conventional manner as by spraying, brushing, and the like, and it has been found that only one such layer need be applied. The thickness of such layer is thus generally thin as from about 0.25 to about 5 mils (0.006–0.127 mm) and preferably from about 1 to about 2 mils (0.0254–0.0508 mm).

Once the fixturing primer has been applied to seat 48 of fixturing sleeve 40 and the rubber primer applied to the bottom or flat surface 32 of bottom bead 30, an adhesive (e.g., a metal to rubber adhesive) 56 is placed or coated onto either metal primer layer 52, or rubber primer layer 54, or both. Bottom bead portion 30 of air spring 10 is then inserted over flange 46 and applied against fixturing sleeve arm seat 48 and adhesive 56 subsequently cured. The adhesive layer 56 of the laminate need not be thick and thus, for example, can range from about 0.5 to about 15 (0.012–0.381 mm) mils and desirably from about 1 to about 2 mils (0.0254–0.0508 mm) in thickness.

The adhesive, such as a metal to rubber adhesive, can be any conventional type known to the art and to the literature and include compounds such as epoxy adhesives; polyurethane adhesives; various amine curable polymers or prepolymers such as the above noted epoxy adhesives and polyurethane adhesives as well as polymers containing acid halide groups or haloformate groups, polymers containing anhydride group which upon reaction with diamines yield amine-acid linkages, and the like, and can be a solvent based or water based or a dispersion in water. Considering the epoxy adhesives or resins, they can be any of the numerous commercially available types. A common and preferred epoxy adhesive is a two-part system which must be mixed where upon epichlorohydrin is condensed with bisphenol-A (diphenylol propane). An excess of the epichlorohydrin is utilized to leave epoxy groups on each end of the low molecular weight polymer, e.g., number average from about 240 to about 3,000. Alternatively, epichlorohydrin can initially be reacted with a variety of hydroxy, carboxy, and amino compounds to form monomers with two or more epoxide groups, and these monomers can then be reacted with bisphenol A. Examples of hydroxyl-containing compounds include resorcinol, hydroquinone, glycols, and glycerol. Examples of other compounds include the diglycidyl derivative of cyclohexane-1,2-dicarboxylic acid, the trigylcidyl derivatives of p-aminophenol and cyanuric acid, and the polyglycidyl derivative of phenolic prepolymers. Epoxidized diolefins are also employed.

The epoxy resins can be cured by many different types of materials including polyamines, preferred, polyamides, urea and phenol-formaldehyde, and organic acids or acid anhydrides, through coupling or condensation reactions. Examples of polyamine curing agents include diethylene triamine, triethylene tetramine, 4,4'-diaminodiphenylmethylamine, and the like, whereas examples of acid anhydride curing agents include phthalic anhydride, tetrahydrophthalic anhydride, nadic methyl anhydride, and chloroendic anhydride. Still other curing agents used to cure epoxy resins via the epoxide groups, include polythiols, dicyandiamide (cyanoguanidine), diisocyanates, and phenolic prepolymers. Some of these agents require weak bases such as tertiary amines and imidazole derivatives to accelerate the curing process. Diluents include reactive (mono- and diepoxides) or nonreactive (di-n-butyl phthalate) solvents.

A preferred adhesive of the present invention is Fusor 320/310-B black, available from Lord Elastomer Products, Erie, Pa. This is an epoxy resin cured by a polyamine curative. The Fusor 320 resin is an off-white paste having a viscosity of from about 300,000 to 1,000,000 centipoises. It weights approximately 1.53 grams per cc and has a flash point of over 200° F. (93° C.). The viscosity is measured by utilizing a Brookfield HBF Viscometer at 77±2° F. with a T-bar "D" spindle at 5 rpm with Heliopath stand, undisturbed sample. The Fusor 310B black hardener is a black paste having a viscosity of from about 300,000 to about 700,000 centipoises, and weighs approximately 1.27 grams per cc. It has a flash point of over 200° F. (93° C.). The viscosity is measured in the same manner as it is for the Fusor 320 resin.

Another large group of suitable adhesives are the various polyurethane adhesives which are known to the art and to the literature. Polyurethanes are formed by the reaction of polyisocyanates with hydroxyl terminated intermediates. Suitable intermediates can be various polyether polyols wherein the ether repeat unit has from 2 to 6 carbon atoms or less preferably, polyester polyols wherein the polyester can be made from the reaction of dicarboxylic acids having from 2 to 10 carbon atoms such as adipic acid with glycols having from 2 to 5 carbon atoms such as hexanediol, ethylene glycol, butanediol, and the like. The polyurethane adhesives are cured, that is, crosslinked, with various polyfunctional compounds such as polyamines, polyacids, polyols, or combinations thereof. Examples of suitable polyamines include diethylenetriamine, ethylenediamine, tetramethylenediamine, various naphthalene diamines such as 1,8-naphthalene diamine, and the like. Another curing agent is Polamine 1,000, manufactured by Polaroid Corporation and the same is an amine terminated polytetrahydrofuran. Suitable polyol crosslinking agents include the various polyhydric alcohols having from 3 to 15 carbon atoms and preferably from 3 to 8 carbon atoms such as triols, tetraols, pentols, and the like, with specific examples including arabitol, sorbitol, trimethylol propane, pentaerythritol, glycerol, the various alkyl glucosides, and the like.

The polyisocyanates are preferably diisocyanates and examples include 4,4' diisocyanatodiphenylmethane, (MDI); 4,4'-diisocyanatodicyclohexylmethane, (HMDI); toluene diisocyanate (TDI); 1,5-naphthalene diisocyanate (NDI); 1,6-hexamethylene diisocyanate, (HDI); isophorone diisocyanate, (IPDI); p-phenylene diisocyanate (PPDI) and trans-1,4-cyclohexane diisocyanate (CHDI). Preferably, polymeric MDI or MDI prepolymers are utilized.

Another class of adhesive includes various amine curable polymers or prepolymers such as preferably the urethanes described hereinbelow, as well as compounds set forth in U.S. Pat. No. 3,755,261, which is hereby fully incorporated by reference. Briefly, such compounds are the various epoxy resins such as those disclosed in the "Encyclopedia of Polymer Science and Technology" Interscience Publishers, New York, (1967), Volume 6, pages 212–221; polymers containing acid halide groups such as

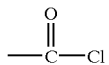

and haloformate groups such as

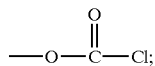

and polymers containing anhydride groups which on reaction with diamines yield amine-acid linkages.

The urethane prepolymers or polymers, that is, those which contain isocyanate groups, are generally formed by first reacting a polyether polyol or a polyester polyol with a molar excess of a diisocyanate to form a prepolymer having terminal isocyanate groups. The polymer is then cured. Examples of such polymers are set forth in U.S. Pat. Nos. 2,620,516; 2,777,831; 2,843,568; 2,866,774; 2,900,368; 2,929,800; 2,948,691; 2,948,707, and 3,114,735, all of which are hereby fully incorporated by reference and serve to further exemplify the urethanes described hereinabove. Typical specific examples of such polyurethanes include Adiprene L-367, polytetramethylene ether glycol containing approximately 6.4 percent isocyanate end groups by weight, manufactured by Uniroyal Chemicals; Adiprene L-42, polytetramethylene ether glycol containing approximately 2.8 percent isocyanate end groups by weight, manufactured by Uniroyal Chemicals; and Cyanaprene A-7, a polyester-based polymer with approximately 2.4 percent isocyanate end groups, manufactured by American Cyanamid. Similar compounds can also be purchased from Anderson Corporation of Michigan. Blends of these polyurethanes can also be utilized. Moreover, it has been found that better adhesion is often obtained by utilizing two different types of urethanes. For example, a urethane containing a high amount by weight of isocyanate end groups such as Adiprene L-367 can be blended with a urethane containing a low amount by weight of isocyanate end groups such as Adiprene L-42. The amount of one urethane to the other can range from about 1 to about 99 percent and desirably from about 30 to about 70 percent by weight.

To the amine curable prepolymer or polymer compound is added a conventional amine curing agent known to those skilled in the art and to the literature, and hence, only a few specific examples will be given. The curing agent can be MOCA, that is, 4,4'-methylene bis(2-chloroaniline) or, desirably a complex of 4,4' methylene dianiline and a salt, or a complex of racemic 2,3-di-(4-aminophenyl) butane and a salt, as set forth in U.S. Pat. No. 3,755,261 to Van Gulick which is hereby fully incorporated by reference. The latter two complexes are preferred. The 4,4'-methylene dianiline compound is preferred and sodium chloride or lithium chloride is the preferred salt. Another class of amine curing agents which can be utilized are the various Versamides, that is, the condensation products of polyamines and dibasic acids obtained when certain unsaturated fatty acids are polymerized, and are manufactured by Henkel Chemical Company. Still another amine curing agent is Polamine, manufactured by Polaroid Corporation as described hereinabove.

The equivalents of reactive moieties in the curing agent utilized with regard to the equivalents of isocyanate (or epoxy) groups of the curable prepolymer or polymer generally ranges from about 85 percent to 115 percent with from about 95 to 105 percent being preferred.

The curing agent and the amine curable polymers or prepolymers form the curable polymer system which is mixed with a polar solvent so that a liquid system is obtained which cures at ambient or room temperature, that is, from about 10° C. to 50° C. Often the ambient temperature will range from about 15° C. to about 35° C. or 40° C. The polar solvents which can be utilized, especially with the amine curing agent and the amine polymers or prepolymers are, for example, set forth in U.S. Pat. No. 3,888,831 to Kogon which is hereby fully incorporated by reference. Generally, the amount of solvent utilized per 100 parts by weight of the curable prepolymer or polymer ranges from about 2 to about 40, desirably from about 2 to about 20, and preferably from about 5 to about 15 parts by weight. Specific examples of preferred solvents include dimethylformamide, tetrahydrofuran, cyclohexanone, ethyl acetate, nitromethane, nitroethane, nitropropane, methyl ethyl ketone, and acetone. Acetone and methyl ethylketone are highly preferred.

The invention will be better understood by reference to the following examples which serve to illustrate, but not to limit the scope of the present invention.

EXAMPLE 1

An aluminum fixturing sleeve was sandblasted to remove the oxidation layer and oils and to create a fresh surface. The sleeve was then degreased with acetone on Rymplecloth. The arm seat 48 of the sleeve was then coated with one coat of Chemlok 254 (Lord Chemical Co.). It was air dried for about 15–20 minutes and then heated at 80° C. for 16–20 hours. The aluminum fixturing sleeve was allowed to cool to room temperature.

The rubber air spring was wiped clean with a piece of Rymplecloth (purified cheesecloth) saturated with acetone. It was allowed to dry for about 10–15 minutes. The flat surface bonding area 32 of the air spring was then primed with a 3% trichlorotriazinetrione (Occidental Co.) in butyl acetate solution. Three coats were used allowing about 5 minutes drying time between coats. The surface after the last coat was wiped off with Rymplecloth immediately after the coat was applied (this removes the by-products and oils that migrate to the surface). The air spring was then allowed to dry (10–15 minutes.)

A two-part adhesive, Fusor 320 and 310B (Lord Chemical Co.), was then mixed. Five parts of 320 and two parts of 310B were used. The two materials were mixed thoroughly for about 5 minutes.

The mixed adhesive was then coated onto the primed aluminum fixturing sleeve surface and onto the primed rubber air spring surface. The two parts were then pressed together and checked to assure that the air spring was in the correct position. The complete assembly was then heated for one hour at 80° C. (the part could be cured at room temperature for 16–20 hours, also). The assembly was allowed to cool to room temperature.

The adhesive bond was tested by attaching the assembly into a MTS machine (MTS Systems Corporation). The machine pneumatically pulls the air spring apart at a constant rate. The air spring did not fail up to the maximum extension of the machine. The force recorded was 2800 lb, (13 kN). The required force needed was only 1500 lb, (7 kn).

EXAMPLE 2

An aluminum fixturing sleeve was sandblasted to remove the oxidation layer and oils and to create a fresh surface. The sandblasted area was further degreased using acetone on Rymplecloth (purified cheesecloth). The area that will be bonded was then coated with one coat of Chemlok 254 (Lord Chemical Co.). It was air dried for about 15–20 minutes and then heated at 80° C. for 15 minutes (the adhesive may also be dried at room temperature). The aluminum fixturing sleeve was allowed to cool to room temperature.

The rubber air spring was wiped clean with a piece of Rymplecloth saturated with acetone. It was allowed to dry for about 10–15 minutes. The bonding area on the air spring was then primed with a 3% trichlorotriazinetrione (Occidental Co.) solution in butyl acetate. Three coats were used allowing about 5 minutes drying time between coats. The surface after the last coat was wiped off with Rymplecloth immediately after the coat was applied (this removes the by-products and oils that migrate to the surface). The air spring was then allowed to dry (10–15 minutes).

The two part adhesive Fusor 320 and 310B (Lord Chemical Co.) was then mixed. Five parts of 320 and two parts of 310B were used. The two materials were mixed thoroughly for about 5 minutes.

The mixed adhesive was then coated onto the aluminum fixturing sleeve and onto the rubber air spring at the location the bond was to be formed. The two parts were then pressed together and checked to assure that the air spring was in the correct position. The complete assembly was then allowed to cure for 24 hr. at room temperature (23° C.).

The adhesive bond was tested by attaching the assembly into a MTS machine (MTS Systems Corporations). The machine pneumatically pulls the air spring apart at a constant rate. The air spring did not fail up to the maximum extension of the machine. The force recorded was 2,200 lb. (10 kN). The required force needed was only 1,5001 lb.

While in accordance with the Patent Statutes, the best mode and preferred embodiment has been set forth, the scope of the invention is not limited thereto, but rather by the scope of the attached claims.

What is claimed is:

1. A vehicle air spring bonded to a support sleeve, comprising;
    a rubber air spring including sidewall casing plies and a bead portion;
    a fixturing sleeve having a seat, said seat designed to receive said bead portion of said rubber air spring, and an adhesive laminate located on and between said sleeve seat and said air spring bead and adhering said bead to said sleeve seat, said adhesive laminate comprising a rubber primer, a fixturing primer, and a cured adhesive, said rubber primer being a halogen donating compound, or a trichlorotriazinetrione, or a N-halohydantoin, or a N-haloamide, or a N-haloimide, or an acetamide, or combinations thereof.

2. A vehicle air spring bonded to a support sleeve according to claim 1, wherein said rubber primer is reacted with said rubber bead portion of said air spring,
    wherein said fixturing primer is a mixture comprising a chlorosulfonated polyethylene, a chlorinated paraffin, and a polydinitrosobenzene; or an aqueous composition comprising a polyvinyl alcohol stabilized aqueous phenolic resin dispersion, and
    wherein said adhesive is an epoxy based resin, or a polyurethane adhesive, or a polymer containing an acid halide group or a haloformate group, or a polymer containing an anhydride group which upon reaction with a diamine yields an amine-acid linkage.

3. A vehicle air spring bonded to a support sleeve according to claim 2, wherein said rubber primer is is said trichlorotriazinetrione; said N-halohydantoin, said N-haloamide, said N-haloimide; or said acetamide; or combinations thereof;
    wherein said fixturing primer is said mixture of said chlorosulfonated polyethylene, said chlorinated paraffin, and said polydinitrosobenzene,
    and wherein said adhesive is said epoxy or said polyurethane.

4. A vehicle air spring bonded to a support sleeve according to claim 3, wherein said rubber primer is trichlorotriazinetrione;
    and wherein said cured adhesive is derived from a two-part epoxy adhesive wherein one component has a viscosity of about 300,000 to about 1,000,000 centipoises, a flash point of over 200° F. and weighs approximately 1.53 grams per cc, and wherein said other component has a viscosity of from about 300,000 to about 700,000 centipoises, weighs approximately 1.27 grams per cc and a flash point of over 200° F.

5. A vehicle air spring bonded to a support sleeve according to claim 4, wherein said fixturing primer is characterized by absorption in its infrared spectrum at 1420, 1428, 1362, 1250, 1162, 658, and 604 $cm^{-1}$ with respect to chlorosulfonated polyethylene, at 1458, 1445, 1371, 1258, 907, 789, 732, 651, and 613 $cm^{-1}$ with respect to chlorinated paraffin, and at 3111, 1483, 1458, 1258, 1102, 1008, 857, 776, and 563 $cm^{-1}$ with respect to polydinitrosobenzene.

6. A vehicle air spring bonded to a support sleeve according to claim 2, wherein said air spring has an adhesive bond strength to said fixturing sleeve of at least 1,500 pounds.

7. A vehicle air spring bonded to a support sleeve according to claim 5, wherein said air spring has an adhesive bond strength to said fixturing sleeve of at least 1,500 pounds.

8. An adhesive laminate for adhering a rubber to a metal, comprising;
    a reacted rubber primer layer, a metal primer layer, and a cured adhesive layer located between said rubber primer layer and said metal primer layer, wherein said rubber primer is a halogen donating compound, or a trichlorotriazinetrione, or a N-halohydantoin, or a N-haloamide, or a N-haloimide, or an acetamide, or combinations thereof; wherein said metal primer is a mixture comprising a chlorosulfonated polyethylene, a chlorinated paraffin, and a polydinitrosobenzene; or an aqueous composition comprising a polyvinyl alcohol stabilized aqueous phenolic resin dispersion; and wherein said adhesive is an epoxy based resin, or a polyurethane adhesive, or a polymer containing an acid halide group or a haloformate group, or a polymer containing an anhydride group which upon reaction with a diamine yields an amine-acid linkage.

9. An adhesive laminate according to claim 8, wherein said rubber primer is said trichlorotriazinetrione, said N-halohydantoin, said N-haloamide, said N-haloimide, or said acetamide, or combinations thereof;
    wherein said metal primer is said mixture of said chlorosulfonated polyethylene, said chlorinated paraffin, and said polydinitrobenzene, polydinitrosobenzene, and
    wherein said adhesive is said epoxy or said polyurethane.

10. An adhesive laminate according to claim 9, said rubber primer is trichlorotriazinetione;

and wherein said cured adhesive is derived from a two-part epoxy adhesive wherein one component has a viscosity of about 300,000 to about 1,000,000 centipoises, a flash point of over 200° F. and weighs approximately 1.53 grams per cc, and wherein said other component has a viscosity of from about 300,000 to about 700,000 centipoises, weighs approximately 1.27 grams per cc and a flash point of over 200° F.

11. An adhesive laminate according to claim 10, wherein said metal primer is characterized by absorption in its infrared spectrum at 1420, 1428, 1362, 1250, 1162, 658, and 604 $cm^{-1}$ with respect to chlorosulfonated polyethylene, at 1458, 1445, 1 371, 1 258, 907, 789, 732, 651, and 613 $cm^{-1}$ with respect to chlorinated paraffin, and 3111, 1483, 1458, 1258, 1102, 1008, 857, 776, and at 563 $cm^{-1}$ with respect to polynitrosobenzene.

* * * * *